United States Patent
Kling

(10) Patent No.: US 6,627,679 B1
(45) Date of Patent: *Sep. 30, 2003

(54) EXTRUDABLE BARRIER POLYMER COMPOSITIONS, PROCESS FOR PREPARING THE COMPOSITIONS AND MONOLAYER OR MULTILAYER STRUCTURES COMPRISING THE COMPOSITIONS

(75) Inventor: Susan M. Kling, Midland, MI (US)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,129

(22) Filed: Jul. 20, 1999

Related U.S. Application Data

(63) Continuation-in-part of application No. 09/135,895, filed on Aug. 18, 1998, now abandoned.

(51) Int. Cl.[7] .......................... B05D 7/26; C08L 27/04; C08L 33/06; C08L 33/18
(52) U.S. Cl. ................. 523/201; 428/407; 428/520; 428/522; 428/514; 428/515; 427/212; 427/222; 427/385.5; 523/200; 524/501; 524/569
(58) Field of Search ................. 428/407, 327, 428/35.2, 35.7, 35.9, 34.8, 520, 522, 514, 483; 523/200, 201; 524/569, 501; 427/222, 212, 372.2, 385.5, 393.5

(56) References Cited

U.S. PATENT DOCUMENTS

| | | | |
|---|---|---|---|
| 2,558,728 A | | 7/1951 | Britton et al. ............... 524/236 |
| 2,825,721 A | | 3/1958 | Hogan et al. ................ 526/106 |
| 2,931,782 A | * | 4/1960 | Jarrett et al. ................ 428/407 |
| 2,948,638 A | * | 8/1960 | Baird et al. .................. 428/407 |
| 2,993,876 A | | 7/1961 | McGlamery ................ 428/397 |
| 3,007,903 A | | 11/1961 | Stark ........................... 526/65 |
| 3,108,984 A | | 10/1963 | Tomesberg et al. ......... 524/565 |
| 3,250,825 A | | 5/1966 | Martinovich ............... 428/35.5 |
| 3,753,769 A | | 8/1973 | Steiner ........................ 428/331 |
| 3,764,638 A | * | 10/1973 | Hwa et al. ............... 260/876 R |
| 3,813,259 A | * | 5/1974 | Neubert ................... 117/100 C |
| 3,876,578 A | * | 4/1975 | Takada et al. ........ 260/29.6 RB |
| 3,879,359 A | | 4/1975 | Hinkamp et al. ......... 260/80.81 |
| 3,911,193 A | * | 10/1975 | Resz et al. .................. 428/407 |
| 4,041,108 A | | 8/1977 | Shoji et al. .................. 260/881 |
| 4,156,669 A | | 5/1979 | Lee ........................ 260/29.7 R |
| 4,204,050 A | | 5/1980 | Bressier et al. ............... 526/97 |
| 4,255,306 A | | 3/1981 | Gibbs .................... 260/29.6 H |
| 4,296,013 A | | 10/1981 | Gibbs .................. 260/29.6 TA |
| 4,298,654 A | * | 11/1981 | McCarty et al. ............ 428/407 |
| 4,463,131 A | * | 7/1984 | Grandzol et al. ............. 525/76 |
| 4,666,777 A | * | 5/1987 | Ash et al. .................... 428/407 |
| 4,792,490 A | * | 12/1988 | Yasui et al. ................. 428/407 |
| 4,898,782 A | * | 2/1990 | Min et al. ................... 428/407 |
| 4,965,130 A | * | 10/1990 | Min et al. ................... 428/407 |
| 4,972,000 A | * | 11/1990 | Kawashima et al. .......... 521/54 |
| 4,973,670 A | * | 11/1990 | McDonald et al. ......... 428/407 |
| 5,006,368 A | * | 4/1991 | Louks ......................... 427/189 |
| 5,236,649 A | * | 8/1993 | Hall et al. ................... 264/130 |
| 5,248,522 A | * | 9/1993 | Araki et al. ................. 427/173 |
| 5,272,236 A | | 12/1993 | Lai et al. .................. 526/348.5 |
| 5,278,272 A | | 1/1994 | Lai et al. .................. 526/348.5 |
| 5,340,874 A | | 8/1994 | Famili et al. .................. 525/59 |
| 5,443,874 A | | 8/1995 | Tachi et al. ................ 428/36.7 |
| 5,912,277 A | * | 6/1999 | Detterman ..................... 521/92 |
| 6,060,553 A | * | 5/2000 | Lenczyk et al. ............. 524/507 |

FOREIGN PATENT DOCUMENTS

| | | |
|---|---|---|
| EP | 0 621 291 A | 10/1994 |
| EP | 0 810 240 A | 12/1997 |
| WO | 91/03518 A | 3/1991 |
| WO | 95/14063 A | 5/1995 |
| WO | 99/23158 A | 5/1999 |
| WO | 00/32679 | 6/2000 |

OTHER PUBLICATIONS

Mark Alger, Polymer Science Dictionary 2nd edition, 1997, p. 286.*

Mark Alger, Polymer Science Dictionary, Second Edition, Chapman & Hall, pp. 286–287.

* cited by examiner

Primary Examiner—Harold Pyon
Assistant Examiner—Sow-Fun Hon

(57) ABSTRACT

A process for preparing barrier polymer compositions comprises adding an additive, in the form of a latex, to an aqueous dispersion of barrier polymer particles, coagulating the latex additive on the surface of the polymer particles to coat the polymer particles and then drying the latex-coated polymer particles.

27 Claims, No Drawings

EXTRUDABLE BARRIER POLYMER COMPOSITIONS, PROCESS FOR PREPARING THE COMPOSITIONS AND MONOLAYER OR MULTILAYER STRUCTURES COMPRISING THE COMPOSITIONS

CROSS-REFERENCE TO RELATED APPLICATION

This application is a continuation-in-part of application Ser. No. 09/135,895, filed Aug. 18, 1998 abandoned.

BACKGROUND OF THE INVENTION

This invention relates to barrier polymer compositions in general and, more particularly, to vinylidene chloride or vinyl chloride polymer compositions having improved extrudability and to the process for preparing the same.

To improve the extrudability of vinylidene chloride or vinyl chloride polymer resins, additives, such as lubricants (for example, internal and external types), olefinic waxes and oils, have been blended with the vinylidene chloride or vinyl chloride polymer resins prior to fabrication into a final product. The additives are conventionally incorporated into the polymer resins by methods involving intense mechanical working at elevated temperature, on a roller mill or in high intensity mixers. These methods result in less than satisfactory uniform distribution of the additives on the resin particles and, sometimes, in the formation of the additives into agglomerates.

It would be desirable to provide a process for preparing vinylidene chloride polymer and vinyl chloride polymer compositions which ensured generally uniform distribution of additives on the polymer resin particles.

SUMMARY OF THE INVENTION

In a first aspect, the present invention is a vinylidene chloride polymer or vinyl chloride polymer composition comprising vinylidene chloride polymer particles or vinyl chloride polymer particles and a coagulated latex additive coated on the surface of the polymer particles.

In a second aspect, the present invention is a monolayer structure comprising the vinylidene chloride polymer or vinyl chloride polymer composition of the first aspect.

In a third aspect, the present invention is a multilayer structure comprising (1) one or more layers of an organic polymer or a blend of two or more different organic polymers, the organic polymer of one layer being the same as or different from the organic polymer of another layer and (2) one or more layers of the vinylidene chloride polymer or vinyl chloride polymer composition of the first aspect.

In a fourth aspect, the present invention is a process for preparing a vinylidene chloride polymer or vinyl chloride polymer composition which comprises:

(A) adding an additive in the form of a latex to an aqueous dispersion of vinylidene chloride polymer or vinyl chloride polymer particles; and (B) coagulating the latex additive on the surface of the polymer particles to coat the polymer particles.

DETAILED DESCRIPTION OF THE INVENTION

As used herein, the term "barrier polymer" refers to polymers displaying the ability to restrict the passage of gases, such as oxygen, carbon dioxide or moisture vapors.

As used herein, the term "vinylidene chloride polymer" encompasses homopolymers of vinylidene chloride and also copolymers, and terpolymers, thereof, wherein the major component is vinylidene chloride and the remainder is one or more monoethylenically unsaturated comonomer copolymerizable therewith. As used herein, the term "vinyl chloride polymer" encompasses homopolymers of vinyl chloride and also copolymers, and terpolymers thereof, wherein the major component is vinyl chloride and the remainder is one or more monoethylenically unsaturated comonomer copolymerizable therewith.

For vinylidene chloride polymers, an effective amount of polymerized vinylidene chloride monomer is generally in the range of from 60 to 100 percent by weight of polymer.

For vinyl chloride polymers, an effective amount of polymerized vinyl chloride monomer is generally in the range of from 60 to 100 percent by weight of polymer.

Monoethylenically unsaturated monomers which can be employed in the practice of the present invention for preparing the vinylidene chloride polymers and vinyl chloride polymers include vinyl chloride, vinylidene chloride, alkyl acrylates, alkyl methacrylates, acrylic acid, methacrylic acid, itaconic acid, and acrylonitrile, methacrylonitrile. Preferred monoethylenically unsaturated monomers include acrylonitrile, methacrylonitrile, alkyl acrylates, and alkyl methacrylates. More preferred monoethylenically unsaturated monomers include acrylonitrile, methacrylonitrile, and the alkyl acrylates and alkyl methacrylates having from 1 to 8 carbon atoms per alkyl group. Most preferably, the alkyl acrylates and alkyl methacrylates are methyl acrylates, ethyl acrylates, and methyl methacrylates. The most preferred monoethylenically unsaturated monomer is methyl acrylate.

Most preferred vinylidene chloride polymers include polymers formed from 91 to 94 weight percent vinylidene chloride and from 6 to 9 weight percent of methyl acrylate and polymers formed from 80 to 85 weight percent vinylidene chloride and from 15 to 20 weight percent vinyl chloride.

Most preferred vinyl chloride polymer include polymers formed from 91 to 94 weight percent vinyl chloride and from 6 to 9 weight percent of methyl acrylate and polymers formed from 80 to 85 weight percent vinyl chloride and from 15 to 20 weight percent vinylidene chloride.

Vinylidene chloride polymers are known and are commercially available. Processes for preparing them, such as by emulsion or suspension polymerization process, are also familiar to persons of ordinary skill in the art. See, for example, U.S. Pat. Nos. 2,558,728; 3,007,903 and 3,879,359, all of which are incorporated herein by reference. Except as specifically set forth herein, polymerization conditions (for example, temperature and agitation) are those conventionally employed in the polymerization of vinylidene chloride or vinyl chloride. Although the order of addition of the various ingredients is not critical, it is preferred to prepare the complete aqueous phase including initiator, and emulsifier or suspending agent, and then to add the monomer phase. Advantageously, in preparing the aqueous phase, about three-fourths of the water required for the polymerization is added to the reactor prior to the addition of the initiators, plasticizers and other suitable additives, such as, for example, chelating agents and antioxidants. This order of addition of the aqueous phase ingredients helps maintain a monomer-in-water suspension polymerization.

Typically, when the monomer is added to the aqueous phase (monomer-in-water phase), the mixture is heated with agitation, in the substantial absence of oxygen, to a temperature of between about 25° C. and 95° C. for a period sufficient to provide the desired conversion of monomer to polymer. The conversion of monomer to polymer is generally between 50 to 99 percent.

After polymerization is complete, an aqueous suspension or dispersion of the vinylidene chloride or vinyl chloride polymer or resin particles is formed. To form a monomer-free dispersion, residual monomer is preferably removed first by venting the reactor to atmospheric pressure while heating the reactor to 95° C. The dispersion is then transferred to a batch stripper where the remaining residual monomer is vacuum-stripped at 90° C. Thereafter, the dispersion is cooled down, unloaded and dewatered, and the resin is collected and further dried.

The latex additives which can be employed in the practice of the present invention include any polymer latex which can be coagulated, including acrylic polymer latexes, such as Metablen L-1000, an acrylic polymer obtained in latex form from Elf Atochem North America, Inc; vinylidene chloride polymer latexes, such as SARAN™ Resin F-278, a vinylidene chloride polymer latex commercially available from The Dow Chemical Company; impact modifier latexes such as grafted particulate rubbery polymers, including styrene/butadiene latex, methacrylate-butadiene-styrene (MBS), acrylonitrile-butadiene-styrene (ABS) acrylate-methacrylate (all acrylic) and acrylate-butadiene-methacrylate (modified acrylic). These latex additives impart onto the barrier polymers desirable properties such as, for example, improved impact resistance, improved barrier to oxygen, carbon dioxide or water vapor and improved extrudability.

Processes for preparing polymer latexes are known. See, for example, U.S. Pat. No. 3,108,984. Typically, latexes are prepared by dispersing the monomers in an aqueous solution of from 0.05 to 5 percent polymerization initiator, such as potassium persulfate or hydrogen peroxide, and from 0.05 percent of a surface active agent capable of emulsifying the monomers. Many such surface active agents are known. Polymerization is initiated by heating the emulsified mixture usually between 35° C. and 100° C. and continued by maintaining the polymerizing emulsion at the selected temperature. After the polymerization has reached the desired conversion of monomer to polymer, the latex is filtered to remove any precoagulum and stabilized for storage, if necessary, by the addition of a small amount of a surface active agent.

The amount of latex additives which can be employed in the present invention depends on the composition of the vinylidene chloride polymer composition and the processing conditions to which the vinylidene chloride polymer composition is exposed, the intended use of the vinylidene chloride polymer, and the tolerance of the polymer for the additives. That is, how much additive can be added before physical properties of the polymer are adversely affected to an unacceptable level. Other factors are apparent to those expert in the art of polymer formulation and compounding. In general, the amount is from 0.1 to 10, preferably from 0.2 to 5 and most preferably 2 weight percent, based on the weight of the vinylidene chloride polymer composition.

As described previously, an aqueous suspension or dispersion of the vinylidene chloride or vinyl chloride polymer or resin particles is formed after the polymerization of vinylidene chloride or vinyl chloride is complete.

An aqueous dispersion of vinylidene chloride or vinyl chloride polymer particles can also be formed by (1) adding water to a vinylidene chloride or vinyl chloride polymer that has been dewatered but not dried, or to dried vinylidene chloride or vinyl chloride polymer, and (2) stirring the mixture at a temperature sufficient to form an aqueous dispersion of vinylidene chloride or vinyl chloride polymer particles.

The latex additive can be added either to the polymerization reactor before transferring the aqueous dispersion of vinylidene chloride or vinyl chloride polymer resin particles to the monomer stripper vessel, or to the monomer stripper vessel as the polymer resin particles dispersion is being heated to a temperature sufficient to vacuum-strip the residual monomer or to the polymerization reactor or monomer stripper vessel after residual monomers are removed.

The latex additive can also be added to the previously described aqueous dispersion of vinylidene chloride or vinyl chloride polymer resin particles formed from a vinylidene chloride or vinyl chloride polymer that has been dewatered but not dried or from dried vinylidene chloride or vinyl chloride polymer particles.

After adding the latex additive to the aqueous dispersion of vinylidene chloride or vinyl chloride polymer particles, the latex additive is coagulated on the surface of the polymer particles to coat the particles. The coagulation of the latex additive on the surface of the polymer particles can be done by mechanical means or by adding a chemical coagulant to the aqueous dispersion of vinylidene chloride or vinyl chloride polymer particles containing the latex additive. The dispersion of latex-coated vinylidene chloride or vinyl chloride polymer particles is then cooled down, unloaded and dewatered and the latex-coated vinylidene chloride or vinyl chloride polymer particles are collected and further dried.

The coagulants which can be employed in the practice of the present invention are well known in the latex art and include the water soluble inorganic salts of metallic ions. Among the preferred materials are calcium chloride, magnesium chloride, and aluminum sulfate. The most preferred coagulant is calcium chloride. The coagulant is usually employed in an amount of from 0.5 to 20 percent by weight, although the minimum concentration required to coagulate the latex is to be preferred.

Other additives which impart desirable properties such as, for example, heat stabilizers, light stabilizers, pigments, processing aids, and lubricants can be incorporated or formulated into the latex additive by any suitable technique, for example, by simple mixing and stirring. Examples of such additives include pigments, clays, talc, nanofillers, calcium carbonate, stearamide and waxes. These additives are known and several types of each are commercially available.

The vinylidene chloride or vinyl chloride polymer compositions prepared by the process of the present invention can be melt-processed and extruded into any suitable final product, for example, a variety of films or other articles. As is well known in the art, the films and articles are fabricated with conventional coextrusion; for example, feedblock coextrusion, multimanifold die coextrusion, or combinations of the two; injection molding; co-injection molding; extrusion molding; casting; blowing; blow molding; calendering; and laminating.

Exemplary articles include blown and cast, mono and multilayer, films; rigid and flexible containers; rigid and foam sheet; tubes; pipes; rods; fibers; and various profiles. Lamination techniques are particularly suited to produce multi-ply sheets. As is known in the art, specific laminating techniques include fusion; that is, whereby self-sustaining lamina are bonded together by applications of heat and pressure; wet-combining, that is, whereby two or more plies are laminated using a tie-coat adhesive, which is applied wet, the liquid driven off, and in one continuous process combining the plies by subsequent pressure lamination; or by heat reactivation, that is, combining a precoated film with another film by heating, and reactivating the precoat adhesive so that it becomes receptive to bonding after subsequent pressure laminating.

The vinylidene chloride or vinyl chloride polymer compositions of the present invention are particularly suited for fabrication into flexible and rigid containers both in monolayer and multilayer structures used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals.

The monolayer structure comprises the vinylidene chloride or vinyl chloride polymer composition of the present invention.

The multilayer structure comprises (1) one or more layers of an organic polymer or a blend of two or more different organic polymers, the organic polymer of one layer being the same as or different from the organic polymer of another layer and (2) one or more layers of the vinylidene chloride or vinyl chloride polymer composition of the present invention.

The multilayer structure can have three layers comprising (1) a first outer layer of the organic polymer or blend of two or more different organic polymers, (2) a core layer of the vinylidene chloride or vinyl chloride polymer composition of the present invention and (3) a second outer layer of an organic polymer which is the same as or different from the organic polymer of the first outer layer.

The multilayer structure can also have five or seven layers comprising one or more layers of the vinylidene chloride or vinyl chloride polymer composition of the present invention, and the remaining layers comprising an organic polymer or a blend of two or more different organic polymers, the organic polymer of one layer being the same as or different from the organic polymer of another layer.

Adhesive layers may be interposed between contiguous layers of the multilayer structures, depending on the composition and method of preparing the multilayer structure.

Organic polymers which can be used in the practice of the present invention for preparing the multilayer structure include polyolefins, polyamides, polymers based on aromatic monomers, and chlorinated polyolefins.

As used herein, the term "polyolefin" includes homopolymers and copolymers of α-monoolefins and substituted α-monoolefins, particularly α-monoolefins or substituted α-monoolefins having from 2 to 20 carbon atoms. Polyolefins which can be employed in the practice of the present invention for preparing the multilayer laminate structure include polypropylene, polyethylene, and copolymers and blends thereof, as well as ethylene-propylene-diene terpolymers. Preferred polyolefins are polypropylene, linear high density polyethylene (HDPE), heterogeneously-branched linear low density polyethylene (LLDPE) such as DOWLEX™ polyethylene resin (a Trademark of The Dow Chemical Company), heterogeneously-branched ultra low linear density polyethylene (ULDPE) such as ATTANE™ ULDPE (a Trademark of The Dow Chemical Company); homogeneously-branched, linear ethylene/α-olefin copolymers such as TAFMER™ (a Trademark of Mitsui Petrochemicals Company Limited) and EXACT™ (a Trademark of Exxon Chemical Company); homogeneously-branched, substantially linear ethylene/α-olefin polymers such as AFFINITY™ (a Trademark of The Dow Chemical Company), NORDEL® IP and ENGAGE®, Trademarks of DuPont Dow Elastomers LLC, of hydrocarbon rubbers and polyolefin elastomers, respectively; and high pressure, free radical polymerized ethylene polymers and copolymers such as low density polyethylene (LDPE), ethylene-acrylic acid (EAA) copolymers such as PRIMACOR™ (Trademark of The Dow Chemical Company), and ethylene-vinyl acetate (EVA) copolymers such as ESCORENE™ polymers (a Trademark of Exxon Chemical Company), and ELVAX™ (a Trademark of E.I. du Pont de Nemours & Co.). The more preferred polyolefins are the homogeneously-branched linear and substantially linear ethylene copolymers with a density (measured in accordance with ASTM D-792) of 0.85 to 0.99 g/cm$^3$, a molecular weight distribution (sometimes described as the ratio of weight average molecular weight $(m_w)$ to number average molecular weight $(M_n)$ $(M_w/M_n)$) from 1.5 to 3.0, a measured melt index (measured in accordance with ASTM D-1238 (190/2.16)) of 0.01 to 100 g/10 minutes, and an I10/I2 of 6 to 20 (measured in accordance with ASTM D-1238 (190/10)).

The molecular weight distributions of ethylene polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

In general, high density polyethylene (HDPE) has a density of at least about 0.94 grams per cubic centimeter (g/cc) (ASTM Test Method D-1505). HDPE is commonly produced using techniques similar to the preparation of linear low density polyethylenes. Such techniques are described in U.S. Pat. Nos. 2,825,721; 2,993,876; 3,250,825 and 4,204,050. The preferred HDPE employed in the practice of the present invention has a density of from 0.94 to 0.99 g/cc and a melt index of from 0.01 to 35 grams per 10 minutes as determined by ASTM Test Method D-1238.

Polymers based on aromatic monomers which can be employed in the practice of the present invention include polystyrene, polymethylstyrene, polyethylstyrene, styrene/methylstyrene copolymer, and styrene/chlorostyrene copolymer.

Polyamides which can be employed in the practice of the present invention include the various grades of nylon, such as nylon-6, nylon-66 and nylon 12.

Adhesive materials which can be employed in the practice of the present invention for preparing the adhesive layer include ethylene vinyl acetate copolymers, ethylene/ethyl acrylic acid ester copolymers, ionomers, modified polyolefins as described in U.S. Pat. No. 5,443,874, acrylic-based terpolymer adhesives as described in U.S. Pat. No. 3,753,769 and adhesives formed by reacting an epoxy resin and an acidified aminoethylated vinyl polymer as described in U.S. Pat. No. 4,447,494, the relevant portions of all three U.S. patents are incorporated herein by reference. The more preferred adhesive materials are maleic anhydride grafted polyethylene or polypropylene such as ADMER (trademark of Mitsui Petrochemicals) adhesive resins, or ethylene-vinyl acetate copolymer resins such as ELVAX™ (trademark of DuPont). The most preferred adhesive material is ELVAX™ 3175, which is a 6 Melt Index, 28 percent vinyl acetate copolymer. The thickness of the monolayer and multilayer structures of the present invention is variable within wide limits, depending on the contemplated application. In general, the monolayer structure of the present invention has a thickness of from 0.05 to 10 mils, preferably, from 0.2 to 6 mils, most preferably, from 0.4 to 1.8 mils. In general, the multilayer structure of the present invention has a thickness of from 0.05 to 200 mils, preferably from 1 to 100 mils, most preferably, from 2 to 80 mils, with the PVDC polymer layer having a thickness of from 0.005 to 20 mils, preferably from 0.2 to 10 mils, most preferably, from 0.2 to 8.0 mils.

Although the invention is specifically described with respect to vinylidene chloride polymers and vinyl chloride polymers, the present invention also encompasses other barrier polymers such as ethylene vinyl alcohol polymers (EVOH), polyesters, polyamides and acrylonitrile polymers, all of which are known in the art and reference is made thereto for the purposes of this invention.

Preferred ethylene vinyl alcohol polymers which can be employed in the practice of the present invention are those containing 20 to 30 mol percent ethylene.

Preferred polyester which can be employed in the practice of the present invention is poly(ethylene terephthalate (PET). PET is prepared from ethylene glycol and terephthalic acid or ethylene glycol and dimethyl terephthalate.

Preferred polyamides which can be employed in the practice of the present invention are nylon 6, nylon 66, nylon 11 and nylon 12, which are described previously.

Preferred acrylonitrile polymers which can be employed in the practice of the present invention are BAREX™ 210, a rubber-modified acrylonitrile-methyl acrylate copolymer made by BP Chemicals of Ohio, and LOPAC™, high nitrile acrylonitrile-styrene copolymers.

Preferred multilayer film structures of the present invention are those obtainable by substituting the latex-coated barrier resin of the present invention for the barrier layer resin in multilayer films disclosed in The Dow Chemical Company U.S. Pat. Nos. 3,524,795, 4,643,927, 5,002,989 and 5,164,268; W. R. Grace & Co. U.S. Pat. Nos. 5,030,511, 5,202,188, 5,538,770 and 5,679,465; Viskase Corporation U.S. Pat. Nos. 4,740,400, 4,863,784, 4,911,963, 4,988,465 and 5,077,109; American National Can Company U.S. Pat. No. 5,424,347; American Can Company U.S. Pat. No. 4,057,667; Mitsubishi Gas Chemical Co. Inc. U.S. Pat. No. 4,868,026; and Toyo Seikan Kaisha Ltd. U.S. Pat. No. 5,084,500. Most preferred multilayer film structures are those obtainable by substituting the latex-coated barrier resin of the present invention for the barrier layer resin in multilayer films disclosed in The Dow Chemical Company U.S. Pat. Nos. 3,524,795, 4,643,927, 5,002,989 and 5,164,268.

In addition to the barrier polymers, other polymers which can be suspended or dispersed in water or in a suitable non-water solvent can also be coated with latex additives in accordance with the present invention. Such polymers include ethylene/vinyl acetate, polyethylene, polypropylene, polystyrene, polyvinyl acetate, ethylene/acrylic acid, ethylene/methacrylic acid, and polymethylmethacrylate; solid catalysts, solid metals, clays, mica, nanofillers, sand, ores, pigments, dyes and powdered organics such as waxes. Dispersion or suspension of the polymer particles in water or non-water solvents can be prepared by adding the polymer particles to the solvents as a dry powder, prill or pellet mix using sufficient agitation to give a uniform dispersion or suspension. The latex additive, along with any predispersed additives, can then be added to the polymer particle dispersion or suspension, followed by coagulation of the latex additive onto the polymer particles.

The present invention is illustrated in further detail by the following examples. The examples are for the purposes of illustration only, and are not to be construed as limiting the scope of the present invention. All parts and percentages are by weight unless otherwise specifically noted.

EXAMPLE 1

To a 2000 mL beaker was added a vinylidene chloride copolymer (91.5 weight percent vinylidene chloride/8.5 weight percent methyl acrylate) resin that had been dewatered but not dried (460 g) and water (467 g). The mixture was stirred with a magnetic stirrer and heated to 90° C. Metablen L-1000 latex, 50 percent solids (16 g) was added and allowed to stir for 2 minutes. Calcium chloride, 35 percent (6 g) was added to chemically coagulate the latex. Coagulation was completed in 2 minutes as determined by the water becoming clear again. The latex-coated resin was dewatered and dried at 60° C. overnight. Chemical analysis of the latex-coated resin was found to be 1.96 weight percent Metablen L-1000, based on bone dry resin solids. Metablen L-1000 latex is an acrylic polymer latex obtained from Elf Atochem North America, Inc. and comprises 2-propenoic acid 2-methyl-butyl ester, butyl 2-propenoate/methyl 2-methyl-2-propenoate polymer, and sodium lauryl sulfate.

Monolayer and multilayer film samples were prepared from the vinylidene chloride/methyl acrylate resin described above. A visual inspection of these film samples showed that there were no resin particle agglomerates in the films.

EXAMPLE 2

The procedure described in Example 1 was followed except that SARAN™ Resin F-278 latex instead of Metablen L-1000 latex was used. SARAN™ Resin F-278 is a vinylidene chloride polymer latex comprising 7.3 percent by weight methacrylonitrile, 3.2 percent by weight methyl methacrylate and 89.5 percent by weight vinylidene chloride.

Monolayer and multilayer film samples were prepared from the vinylidene chloride/methyl acrylate resin described above. A visual inspection of these film samples showed that were no resin particle agglomerates in the films.

What is claimed is:

1. A vinylidene chloride or vinyl chloride polymer composition comprising vinylidene chloride polymer particles or vinyl chloride polymer particles and a latex additive coagulated on the surface of the polymer particles, the latex additive comprising 7.3 percent by weight methacrylonitrile, 3.2 percent by weight methyl methacrylate and 89.5 percent by weight vinylidene chloride.

2. A vinylidene chloride or vinyl chloride polymer composition comprising vinylidene chloride polymer particles or vinyl chloride polymer particles and a latex additive coagulated on the surface of the polymer particles, the latex additive comprising 2-propenoic acid 2-methyl-butyl ester, butyl 2-propenoate/methyl 2-methyl-2-propenoate polymer, and sodium lauryl sulfate.

3. A process for preparing a vinylidene chloride or vinyl chloride polymer composition which comprises:
   (A) adding an additive in the form of a latex to an aqueous dispersion of uncoagulated vinylidene chloride or vinyl chloride polymer particles; and
   (B) coagulating the latex additive on the surface of the polymer particles to coat the polymer particles wherein the latex additive is coagulated on the surface of the polymer particles by mechanical means or by adding a chemical coagulant to the aqueous dispersion of polymer particles containing the latex additive.

4. The process of claim 3 which further comprises drying the latex additive-coated polymer particles.

5. The process of claim 3 wherein the additive is an acrylic polymer latex, a vinylidene chloride polymer latex or a styrene-butadiene polymer latex.

6. A process for preparing a vinylidene chloride or vinyl chloride polymer composition which comprises:
   (A) adding an additive in the form of a latex to an aqueous dispersion of vinylidene chloride or vinyl chloride polymer particles; and
   (B) coagulating the latex additive on the surface of the polymer particles to coat the polymer particles, the latex additive comprising 7.3 percent by weight methacrylonitrile, 3.2 percent by weight methyl methacrylate and 89.5 percent by weight vinylidene chloride.

7. A process for preparing a vinylidene chloride or vinyl chloride polymer composition which comprises:
   (A) adding an additive in the form of a latex to an aqueous dispersion of vinylidene chloride or vinyl chloride polymer particles; and
   (B) coagulating the latex additive on the surface of the polymer particles to coat the polymer particles, the latex additive comprising 2-propenoic acid, 2-methylbutyl ester, butyl 2-propenoate/methyl 2-methyl-2-propenoate polymer, and sodium lauryl sulfate.

8. The process of claim 3 wherein the additive is added in an amount of from 0.1 to 10, based on the weight of the vinylidene chloride polymer composition.

9. The process of claim 8 wherein the additive is added in an amount of from 0.2 to 5, based on the weight of the vinylidene chloride polymer composition.

10. The process of claim 9 wherein the additive is added in an amount of 2 weight percent, based on the weight of the vinylidene chloride polymer composition.

11. The process of claim 3 wherein the vinylidene chloride polymer is formed from 91 to 94 weight percent vinylidene chloride and from 6 to 9 weight percent methyl acrylate, or from 80 to 85 weight percent vinylidene chloride and from 15 to 20 weight percent vinyl chloride.

12. The polymer composition of claim 1 wherein an additional additive which imparts desirable characteristics is admixed with the latex additive.

13. The composition of claim 12 wherein the additional additive comprises at least one heat stabilizer, light stabilizer, pigment, processing aid, lubricant or mixtures thereof.

14. The composition of claim 12 wherein the additional additive includes at least one member of the group comprising pigments, clays, talcs, nanofillers, calcium carbonate, stearamide and waxes.

15. The polymer composition of claim 2 wherein an additional additive which imparts desirable characteristics is admixed with the latex additive.

16. The composition of claim 15 wherein the additional additive comprises at least one heat stabilizer, light stabilizer, pigment, processing aid, lubricant or mixtures thereof.

17. The composition of claim 15 wherein the additional additive includes at least one member of the group comprising pigments, clays, talcs, nanofillers, calcium carbonate, stearamide and waxes.

18. The process of claim 3 wherein an additional additive which imparts desirable characteristics is admixed with the latex additive.

19. The process of claim 18 wherein the additional additive comprises at least one of heat stabilizer, light stabilizer, pigment, processing aid, lubricant or mixtures thereof.

20. The process of claims 18 wherein the additional additive includes at least one member of the group comprising pigments, clays, talcs, nanofillers, calcium carbonate, stearamide and waxes.

21. The process of claim 6 wherein an additional additive which imparts desirable characteristics is admixed with the vinylidene chloride polymer latex.

22. The process of claim 21 wherein the additional additive comprises at least one heat stabilizer, light stabilizer, pigment, processing aid, lubricant or mixtures thereof.

23. The process of claim 21 wherein the additional additive includes at least one member of the group comprising pigments, clays, talcs, nanofillers, calcium carbonate, stearamide and waxes.

24. The process of claim 7 wherein an additional additive which imparts desirable characteristics is admixed with the acrylic polymer latex.

25. The process of claim 24 wherein the additional additive comprises at least one heat stabilizer, light stabilizer, pigment, processing aid, lubricant or mixtures thereof.

26. The process of claim 24 wherein the additional additive includes at least one member of the group comprising pigments, clays, talcs, nanofillers, calcium carbonate, stearamide and waxes.

27. A process for preparing a vinylidene chloride or vinyl chloride polymer composition which comprises:
   (A) adding an additive in the form of a latex to an aqueous dispersion of uncoagulated vinylidene chloride or vinyl chloride polymer particles wherein the aqueous dispersion of vinylidene chloride or vinyl chloride polymer particles is formed as a result of a polymerization of monomers including vinylidene chloride and/or vinyl chloride; and
   (B) coagulating the latex additive on the surface of the polymer particles to coat the polymer particles wherein the latex additive is coagulated on the surface of the polymer particles by mechanical means or by adding a chemical coagulant to the aqueous dispersion of polymer particles containing the latex additive.

* * * * *